April 27, 1937.　　P. R. LEE ET AL　　2,078,674
BAFFLED THERMOSTAT
Filed Jan. 2, 1935　　3 Sheets-Sheet 1
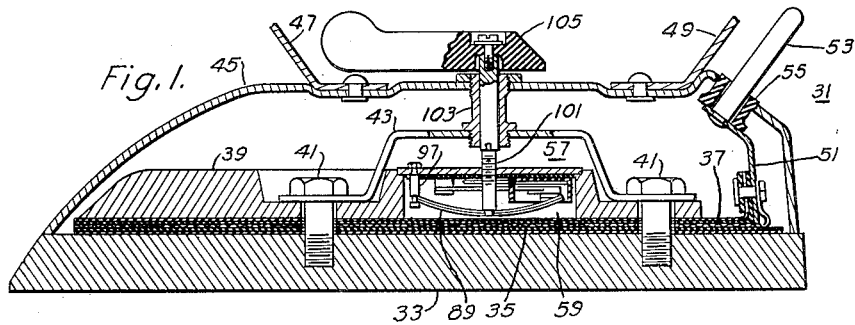
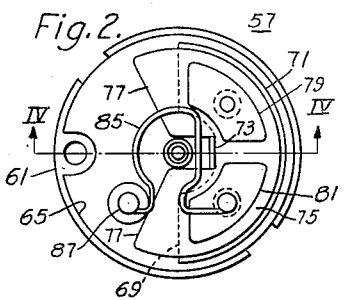
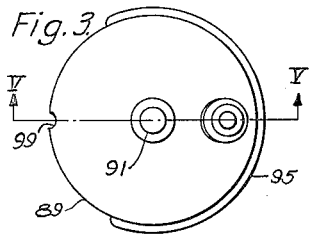
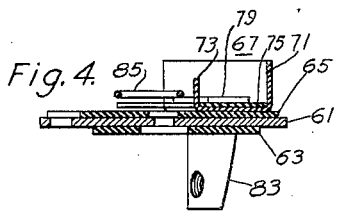
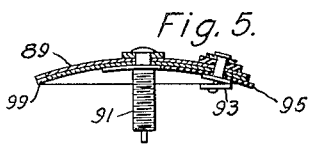
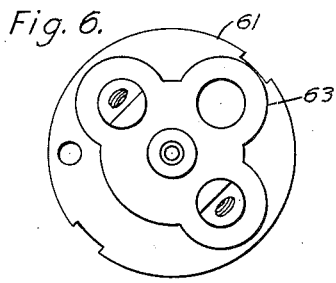
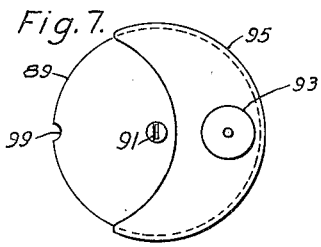
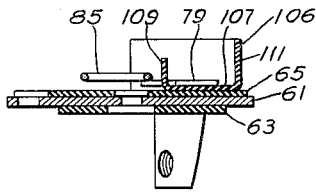
WITNESSES:
INVENTORS
Paul R. Lee &
Oliver S. Jennings
BY
ATTORNEY

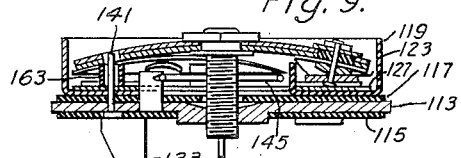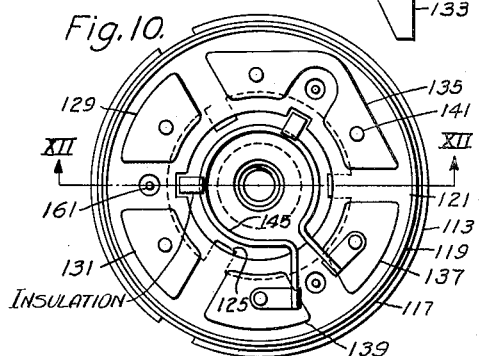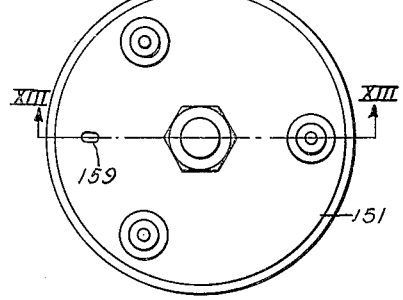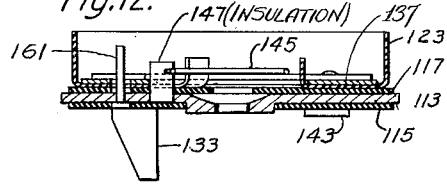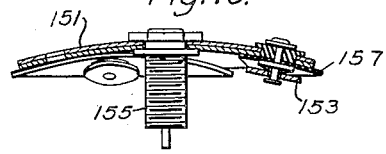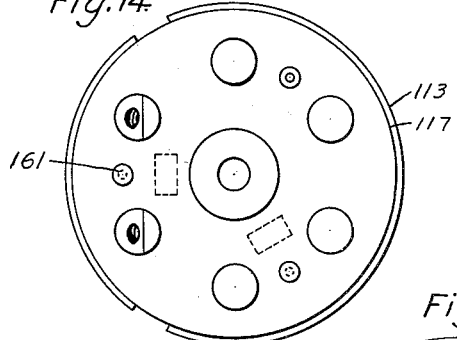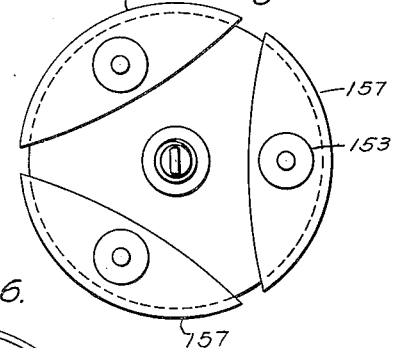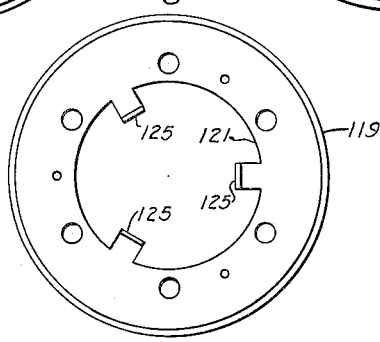

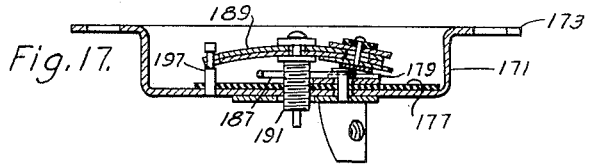
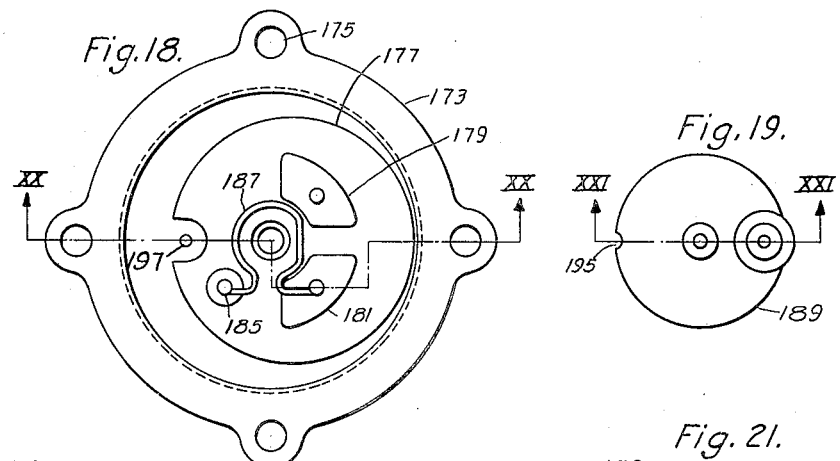
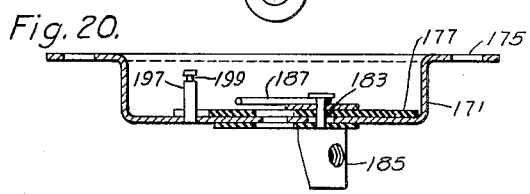
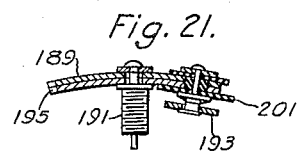
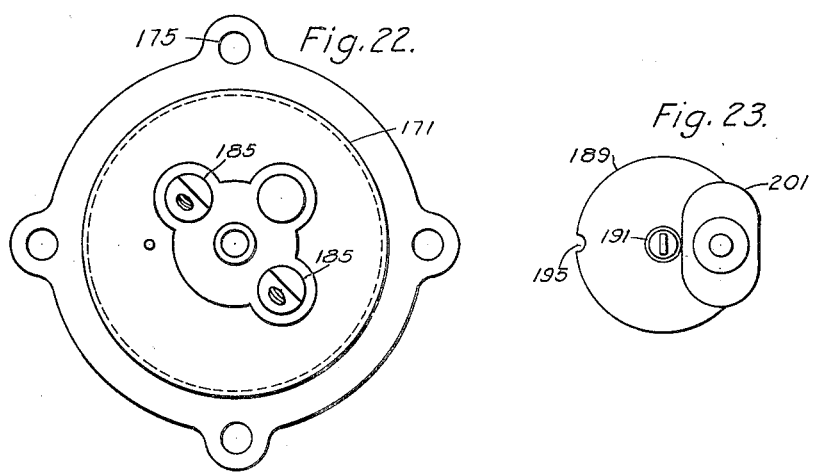
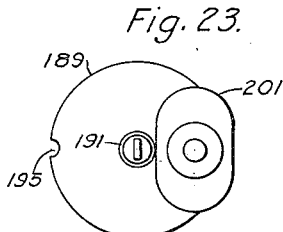

Patented Apr. 27, 1937

2,078,674

UNITED STATES PATENT OFFICE 2,078,674

BAFFLED THERMOSTAT

Paul R. Lee and Oliver S. Jennings, Mansfield, Ohio, assignors to Westinghouse Electric & Manufacturing Company, East Pittsburgh, Pa., a corporation of Pennsylvania Application January 2, 1935, Serial No. 58

5 Claims. (Cl. 200—138)

Our invention relates to circuit breakers and particularly to thermal switches.

An object of our invention is to provide a relatively simple means for preventing injury to small thermostatic switches or circuit breakers when the same are operated at relatively high current values.

Another object of our invention is to provide a means applicable to thermally-actuable switches utilized for the control of grounded circuits for preventing grounding of any part of the switch during operation thereof.

Other objects of our invention will either be apparent, without further recitation thereof, from the following description of several modifications of devices embodying our invention, or will be specifically pointed out hereinafter.

In practicing our invention we provide a thermostatic switch including a base, at least one pair of spaced fixed contact members on said base, and a bimetallic element actuable under change of temperature to open a circuit controlled by the device, and having a contact bridging member mounted on a movable part thereof. The base may be provided, in the simplest form of our invention, with a relatively large barrier plate of electric insulating material located between the contact members and the base and extending appreciable distances away from the edge portions of the contact members. The bimetallic element is provided with a thin sheet or plate of electric-insulating material having a much greater surface area than the contact bridging member and located between the contact bridging member and the bimetal element, the said plate of electric-insulating material having a much greater dimension in one direction than in another direction at right angles thereto.

In another form of device embodying our invention, we provide a baffle plate, preferably, but not necessarily, made of electric-insulating material having laterally extending flanges, one of which is located within the fixed contact members on the base and the other of which is located without the fixed contact members on the base.

In the drawings:

Figure 1 is a view in vertical longitudinal section through an electrically heated device having a thermostatic switch embodying our invention associated therewith;

Fig. 2 is a top plan view of one form of thermal switch embodying our invention and showing more particularly the base, the contact members thereon, and one form of baffle plate;

Fig. 3 is a top plan view of a bimetallic member used with the member shown in Fig. 2 of the drawings;

Fig. 4 is a view in radial section through the parts shown in Fig. 2 and taken on the line IV—IV thereof;

Fig. 5 is a view in radial section through the parts shown in Fig. 3 of the drawings and taken on the line V—V thereof;

Fig. 6 is a bottom plan view of the parts shown in Figs. 2 and 4 of the drawings;

Fig. 7 is a bottom plan view of the parts shown in Figs. 3 and 5 of the drawings;

Fig. 8 is a view similar to Fig. 4 of the drawings, but showing a modified form of device embodying our invention;

Fig. 9 is a view in diametral section through another form of device embodying our invention;

Fig. 10 is a top plan view of part only of the assembly shown in Fig. 9 of the drawings;

Fig. 11 is a top plan view of a bimetal element and its support constituting a part of the assembly shown in Fig. 9 of the drawings;

Fig. 12 is a view in diametral section through the parts shown in Fig. 10 of the drawings and taken on the line XII—XII thereof;

Fig. 13 is a diametral view of the parts shown in Fig. 11 of the drawings and taken on the line XIII—XIII thereof;

Fig. 14 is a bottom plan view of the parts shown in Figs. 10 and 12 of the drawings;

Fig. 15 is a bottom plan view of the parts shown in Figs. 11 and 13 of the drawings;

Fig. 16 is a top plan view of one form of baffle plate embodying our invention;

Fig. 17 is a view in diametral section through another form of device embodying our invention;

Fig. 18 is a top plan view of certain parts only of the assembly shown in Fig. 17;

Fig. 19 is a top plan view of a bimetal disc, its support and a contact bridging member mounted thereon;

Fig. 20 is a view in diametral section through the assembly shown in Fig. 18 of the drawings and taken on the line XX—XX thereof;

Fig. 21 is a view in diametral section through the parts shown in Fig. 19 of the drawings and taken on the line XXI—XXI thereof;

Fig. 22 is a bottom plan view of the parts shown in Figs. 18 and 20 of the drawings; and Fig. 23 is a bottom plan view of the parts shown in Figs. 19 and 21 of the drawings.

Our invention is particularly applicable to small, high-capacity snap-acting thermostatic switches and we have, therefore, elected to show several different modifications of devices embodying our invention, but desire it to be understood that our invention is not to be limited to these devices only, since it may be applied to other small circuit breakers.

When it becomes necessary to provide a thermally-actuable switch in close heat-conducting engagement with an appliance or device being heated to control the temperature of a selected part of the appliance or device, it may become desirable or necessary to use a relatively small thermal switch. This is made possible by the use of a bimetallic element of the snap-acting kind disclosed and claimed in United States Patent No. 1,448,240 to J. A. Spencer. Where the value of the current in the circuit to be controlled is small, it is fairly easy to interrupt this circuit without the occurrence of dangerous arcs between the cooperating and relatively movable contact members, but because of the present-day tendency to increase the amount of electrical energy to be translated into heat in certain devices, particularly domestic appliances, it is becoming more and more difficult to obtain proper operation of a thermal switch of relatively small size when called upon to rupture current values on the order of 10 or more amperes either at 110 volts or at higher operating voltages.

Where, as may be necessary or required in certain cases, one side of the circuit is permanently grounded, and where an electric conducting part of the appliance or device is also grounded, any excessive arcing when interrupting heavy-current circuits may cause considerable damage if the arc between the separating contact members should touch the grounded part of the device.

While we have shown in Fig. 1 of the drawings an electric sadiron with which a device embodying our invention is operatively associated, we obviously do not desire to be limited thereto.

In Fig. 1, an electric iron 31 comprises a sole plate 33, upon which is located an extended electric heating unit 35 which may be of any suitable or desired type, but is here shown as including a plurality of plates of electric insulating material and an intermediate electric resistor 37. A top or clamping plate 39 is located above the electric heating element 35 and is tightly clamped thereagainst as by a plurality of clamping bolts 41, which at the same time secure a bracket 43 in its proper operative position. The iron 31 includes also a cover 45 having a front handle strap 47 and a rear handle strap 49 located thereon in a manner well known in the art, as well as a handle secured to the upper ends of the straps 47 and 49, but not shown in the drawings.

The terminals of the resistor 37 are electrically connected to a pair of upwardly extending straps 51, only one of which is visible in Fig. 1 of the drawings, terminal prongs or pins 53 being secured to the upper ends of the respective straps 51 and extending outwardly through the rear portion of the cover 45 through an electric-insulating bushing 55.

The energization of the heating element 35 and, therefore, the temperature of the electric iron is controlled by a snap-acting thermostatic switch assembly designated generally by the numeral 57 and located in a substantially circular recess 59 in the top plate 39.

The thermostatic switch 57 (see Figs. 2 to 7, inclusive) includes a disc-like base 61, preferably made of metal, and having a small plate 63 of electric-insulating material against one face thereof and a slightly larger plate or disk 65 of electric-insulating material adjacent the other face thereof. A baffle member 67, comprising a flat portion 69 located adjacent to the outer face of sheet 65, this flat portion being substantially of semi-circular shape, includes further an outer arcuate-shaped portion or upstanding wall 71 and an inner similar portion 73. Both of these portions 71 and 73 extend laterally away from the flat portion 69 and members 65 and 61. An arcuate plate 75 of electric-insulating material, such as mica, is located adjacent to the outer face of baffle member 67, and the edge portions 77 thereof extend well beyond the edge portions of the flat portion 69 of baffle member 67. A pair of substantially fixed contact members 79 and 81, each of arcuate shape, have one face thereof located closely adjacent to the outer face of plate 75 in substantially the positions shown in Fig. 2 of the drawings, the adjacent edges being spaced apart a small distance. Terminal members 83 are also provided and have one portion thereof, of reduced diameter, extending through suitable aligned openings in members 61, 63, 65, 69 and 75, and into the respective contact members 79 and 81, which may be securely held in proper operative position by riveting over the slightly projecting end of each of the terminals 83.

We also provide a small auxiliary heating element 85 which is connected in series circuit relation relatively to the two fixed contact members 79 and 81, one end thereof being connected, say, with contact member 81, while the other end is connected to a third terminal member 87, which may be of the same general design and construction as terminals 83. This auxiliary heater tends to reduce the temperature differential of operation of the snap-acting disc.

A bimetal disc 89 of the kind hereinbefore described and claimed in Spencer Patent No. 1,448,240 is operatively associated with the parts shown in Figs. 2, 4 and 6 of the drawings. It is supported from the base 61, as by an externally screw-threaded stud 91, at one end of which the disc 89 is loosely mounted so that the edge may move from the position shown more particularly in Fig. 5 of the drawings to the oppositely cupped or dished position of the disc (not shown in the drawings). The disc 89 has insulatedly mounted thereon at a point adjacent to and slightly within its outer periphery a contact bridging member 93 which is adapted, in one position of the disc 89, to engage the adjacent ends of contact members 79 and 81 (Fig. 2) in order to close a circuit controlled by the thermostatic switch. A relatively large sheet 95, of electric-insulating material such as mica, is located on the inner side of the disc 89 and extends for an appreciable distance both radially outwardly and radially inwardly relatively to the contact bridging disc 93, but it also extends for a relatively large distance peripherally relatively to each side of the contact bridging disc 93, as is shown more particularly in Fig. 7 of the drawings.

At a point on the base 61 diametrally opposite from the space between the adjacent ends of contact members 79 and 81 there is located a small stud 97 (see Fig. 1 of the drawings) having a small annular recess near one end thereof which engages a recess 99 in the disc 89, the recess 99 being longitudinally opposite to the contact bridging member 93. The result of this is that when the disc 89 moves to its oppositely dished position under the influence of a change of its temperature, the contact bridging member or disc 93 will move through a relatively large distance away from the fixed contact members 79 and 81.

As it is usually desirable to control the operating temperature of the thermostatic switch, we may substitute for the short stud 91, shown in Figs. 2, 3, 5 and 7 of the drawings, a longer stud 101 (see Fig. 1 of the drawings) which may extend through a hollow nut 103, which may be screw-threadedly connected to both the cover 45 and the bracket 43, thus being utilized for tightly clamping the cover 45 in its proper operative position relatively to the other parts of the iron. The stud 101 extends through the member 103 and above the cover and has secured thereto an actuating arm 105 which is utilized to adjust the position of the center portion of the disc 89 to thereby vary the temperature at which interruption of the circuit controlled by the switch will be effected.

If the value of the current traversing the heating element 35 is relatively large, the two gaps available to open the circuit by the contact bridging disc 93 and the two contact members 79 and 81 may draw a relatively heavy arc and, if the auxiliary heating element 85 is provided and is connected as shown, this arc may be forced substantially radially outwardly. If the outer upstanding wall 71 were not provided, the arc might travel out to the adjacent part of the wall of recess 59 in the top plate 39. If this part of the device should happen to be grounded, it is obvious that severe damage might result not only to the parts of the thermostatic switch, but also to the appliance or device itself, and the use of a baffle plate of the kind embodied in member 67 will tend to prevent such damage. If, for any reason, the arc should travel radially inwardly, the upstanding baffle plate 73 will have substantially the same effect in preventing grounding of the arc and consequent damage to parts of the switch or of the appliance or device.

Referring now to Fig. 8 of the drawings, we have there illustrated a simplified form of baffle plate 106 which we may use instead of the metallic baffle plate 67. We have shown the same base 61, a layer 63 of electric insulating material against one face, a layer 65 of electric insulating material against its other face, and a baffle plate 106 which comprises, in addition to the flat portion 107 located against the outer face of plate 65, an inner lateral flange or upstanding wall 109 and an outer arcuate flange portion 111. Contact members 79 and 81 are provided as well as a heating unit 85, and the only difference between the assembly of Fig. 8 and that of Fig. 4 is the substitution of a baffle member 106 of electric-insulating material instead of the metal baffle member 67.

The operation of the assembly shown in Fig. 8, which is, of course, to be understood as including the parts shown in Figs. 3, 5 and 7, inclusive, is substantially the same as has just been hereinbefore described in connection with Figs. 2, 4 and 6.

Referring now to Figs. 9 to 16, inclusive, we have there illustrated a form of snap-acting thermostatic switch similar to that just described, but including a greater number of fixed and movable contact members. A base 113 of metal in the shape of a disc has mounted adjacent one face thereof a disc 115 of electric-insulating material, such as mica, and a second disc of electric-insulating material 117 adjacent to and against its other face. A baffle member 119 includes an annular base portion 121 (see more particularly Fig. 16 of the drawings) and an upstanding peripheral flange portion 123 at the outer part of the base portion 121. A plurality of inner upstanding relatively narrow flanges 125 are also provided, the number of these flanges corresponding to the number of contact members as will hereinafter be set forth in detail. An annular member 127 of electric-insulating material is located within the baffle 119, and we may enamel the entire surface of the cylindrical baffle member 119 with a high temperature resisting coating in order to assist in withstanding the high temperature of an arc.

We provide a plurality of terminal contact plates 129 and 131, each having a terminal member 133 secured thereto as well as a contact member 135 of relatively large peripheral extent and two additional contact members 137 and 139, whose general shape and location are all shown more particularly in Fig. 10 of the drawings. Any suitable or desired means, such as short rods 141, may be provided cooperating with the respective contact members 135 to 139, inclusive, and extending through the base 113 and the other closely associated members and having a head portion 143 on the other side of the assembly. The contact members 137 and 139 have connected in series circuit therewith an auxiliary heating element 145 for the same purpose as was hereinbefore described for heating element 35 shown in Fig. 2 of the drawings. The wire 145 may be supported as by small blocks 147 of electric-insulating material having recesses therein in which the wire is located.

A snap-acting bimetallic disc 151 is provided, which is the counterpart of disc 89 hereinbefore described, except that it is provided with a plurality of contact bridging members 153, here shown as three in number, and located near the periphery of the disc and insulatedly supported thereby. A central stud 155 is provided to support the disc 151 from the base 113 with which it has screw-threaded engagement, and the disc 151 is so mounted at one end of stud 155 that it may move from one of its limiting positions to the other limiting position where it is dished in the reversed direction with a snap action and without binding on its support.

We provide a plurality of plates 157 of electric-insulating material, such as mica, located on the inside of the disc 151 and between the contact bridging members 153 and the disc 151. The radial dimension of the respective sheets 157 is much greater than that of the contact bridging disc 153, while the tangential dimension of these sheets is very much greater than that of the contact bridging member 153. Since it is evident that the general direction of an arc between the separating fixed contact members and the contact bridging member is tangential of the disc and of the thermal switch, the arc will be prevented from engaging the disc by reason of the presence of sheets 157 and at the same time the arc will be prevented from traveling radially outwardly to come in contact with a part of the appliance, by reason of the wall 123. Any inward travel of the arc will be prevented by the flanges 125.

The construction so far described in Figs. 9 to 16, inclusive, will have no directional effect upon the disc 151, and in order to hold the disc in a desired peripheral position, it is provided with an opening 159, as shown in Fig. 11 of the drawings, and a guide pin 161 is provided in the base 113, the upper end of which extends through the opening 159, permitting snap-acting movement of the disc from one of its limiting positions to the other, but preventing any peripheral movement of the disc relatively to the base. Since pin 161 is grounded in base plate 113, we prefer to surround it by a small tubular member 163, preferably made of porcelain, although any other high temperature-resisting electric-insulating material may be used.

Referring now to Figs. 17 to 23, inclusive, we have there illustrated a still further modification of a switch embodying our invention. In this particular application, we have shown the thermostatic switch as embodying a cup-like casing 171 having a peripheral flange 173 with openings 175 therein through which screws (not shown in the drawings) may extend to secure the casing and the thermal switch located therein against a surface of an appliance whose temperature is to be controlled, which surface may be either flat, to cooperate with the casing 171, or which may be of arcuate shape, in which case, casing 171 and particularly its inner edge portion will be shaped to correspond.

We provide a sheet 177 of electric-insulating material, such as mica, located within the cup-shaped casing 171. A pair of fixed contact members 179 and 181, each of arcuate shape and having their adjacent ends spaced apart a small distance, are secured against the outer face of sheet 177 as by reduced end portions 183 of terminal members 185. An auxiliary heating element 187 is provided, which is connected in series circuit relation with one contact member 181 and one of the two contact terminals 185.

A snap-acting bimetallic disc 189 is loosely mounted adjacent to one end of a screw-threaded stud 191 so that the disc may move freely from one of its limiting positions, for example, that shown in Fig. 21 of the drawings, to its opposite limiting position where it will be dished in the opposite direction. A contact bridging member 193 is insulatedly mounted on the disc 189 near its periphery at one point thereof, the disc being provided with a small recess 195 located diametrically opposite to the contact bridging member 193. A pin 197 has one end fixedly mounted in member 171, while it is provided near the other end with a small annular recess 199 adapted to cooperate with recess 195 in bimetallic disc 189 to hold that edge portion of the disc fixed relatively to the base 171. When bimetallic disc 189 snaps to its other position, contact bridging member will be moved a relatively large distance away from contact members 179 and 181.

In accordance with our invention, the disc 189 has located thereon a relatively large plate 201 of electric-insulating material, such as mica, which plate 201 is located between the contact bridging member 193 and the disc 189. The dimension of the plate 201 radially of the disc 189 is such that it extends well beyond the dimensions of disc 193, while it extends for a much greater distance tangentially of the assembly whereby to prevent engagement of an arc with the disc 189.

In this particular thermostatic switch, the distances between the cooperating contact members and a grounded portion of the thermostatic switch are sufficiently great so that we have found it unnecessary to use a baffle plate of the kind hereinbefore described, but have found it sufficient for our purpose to use only the barrier plates 177 on the fixed part of the assembly and the barrier plate 201 on the movable part of the assembly, each of these plates being made of electric-insulating material.

However, where the dimensions are much smaller, we have found it advisable to utilize the baffle plate, preferably made of electric-insulating material, but where this is not possible, we have found that we can obtain good operation by the use of metal baffle plates suitably insulated as has already been described.

The device embodying our invention as shown in its various modifications has made it possible to control much greater current values by relatively small thermostatic switches than has heretofore been possible, and this is particularly the case when it is a question of controlling the energization of grounded circuits.

Various other modifications may be made in our invention without departing from the spirit and scope thereof, and we desire, therefore, that only such limitations shall be placed thereon as are imposed by the prior art, or are set forth in the appended claims.

We claim as our invention:

1. In a thermostatic switch, the combination with a fixed base, a pair of spaced contact members supported on the base, a bimetal member supported on the base, and a contact bridging member supported on the bimetal member, of a barrier plate of electric-insulating material between the pair of spaced contact members and the metal base extending both longitudinally and laterally of the spaced contact members for a relatively large distance and having a plurality of laterally spaced upstanding flanges, and a second barrier plate of electric-insulating material between the contact bridging member and the bimetal element and carried by the latter and extending an appreciable distance longitudinally beyond the surface area of the contact bridging member.

2. In a thermostatic switch, the combination with a disc-like base, a pair of tangentially-spaced contact members supported by the base adjacent one face thereof, a snap-acting bimetal disc supported by the base at one part thereof and having another part thereof free to move relatively to the base, and a contact-bridging member on the movable part of the bimetal disc, of a baffle plate of substantially arcuate shape having radially inner and outer upstanding walls and extending beneath the tangentially-spaced contact members.

3. In a thermostatic switch, the combination with a disc-like base, a pair of tangentially-spaced contact members supported by the base adjacent one face thereof, a snap-acting bimetal disc supported by the base at one part thereof and having another part thereof free to move relatively to the base and a contact-bridging member on the movable part of the bimetal disc, of a baffle plate having a flat base portion located beneath the spaced contact members, an inner upstanding portion radially inside the spaced contact members and an outer upstanding arcuate portion radially outside the spaced contact members.

4. In a thermostatic switch, the combination with a metal disc base, a plate of electric-insulating material located against one face of the base, a pair of tangentially-spaced contact members adjacent to the plate of electric-insulating material, a snap-acting bimetallic disc having one portion supported on the base and having another portion free to move relatively to the base, and a contact bridging member mounted on the movable portion of the bimetal disc, of a metal baffle plate having a flat part located in contact with the outside face of the plate of electric-insulating material and beneath the tangentially spaced contact members, said baffle plate having an inner lateral flange and an outer lateral flange respectively located radially within and without the tangentially-spaced contact members, and a layer of electric-insulating material between the contact members and flat part of the baffle plate.

5. In a thermostatic switch, the combination with a metal disc base, a plate of electric-insulating material located against one face of the base, a pair of tangentially-spaced contact members adjacent to the plate of electric-insulating material, a snap-acting bimetallic disc having one portion supported on the base and having another portion free to move relatively to the base and a contact bridging member mounted on the movable portion of the bimetal disc, of a metal baffle plate having a flat part located in contact with the outside face of the plate of electric-insulating material and beneath the tangentially spaced contact members, said baffle plate having an inner lateral flange and an outer lateral flange respectively located radially within and without the tangentially-spaced contact members, a layer of electric-insulating material between the contact members and flat part of the baffle plate, and a sheet of electric-insulating material supported by the movable part of the bimetallic disc, located between the bimetallic disc and the contact bridging member and extending a relatively large distance tangentially beyond the contact bridging member.

OLIVER S. JENNINGS.
PAUL R. LEE.